United States Patent [19]
Chacin et al.

[11] Patent Number: 5,161,574
[45] Date of Patent: Nov. 10, 1992

[54] MAXIMUM OPERATION ANGLE SINGLE PLUG AND PUPPET TYPE RETENTION VALVES

[75] Inventors: Jesus E. Chacin, Caracas; Amnon M. Vadasz F., San Antonio de Los Altos, both of Venezuela

[73] Assignee: Intevep, S.A., Caracas, Venezuela

[21] Appl. No.: 756,937

[22] Filed: Sep. 9, 1991

Related U.S. Application Data

[63] Continuation-in-part of Ser. No. 569,823, Aug. 20, 1990, abandoned.

[51] Int. Cl.⁵ .............................................. F16K 15/06
[52] U.S. Cl. ................................................ 137/533.17
[58] Field of Search .................... 137/528, 533, 533.17, 137/533.29, 540

[56] References Cited

U.S. PATENT DOCUMENTS

| | | | |
|---|---|---|---|
| 1,913,116 | 6/1933 | Haimbaugh | 137/533.17 |
| 2,247,568 | 7/1941 | Armbrust | 137/533 |
| 4,414,997 | 11/1983 | Jacobson | 137/533.17 X |
| 4,570,669 | 2/1986 | Pauliukonis | 137/533 X |

FOREIGN PATENT DOCUMENTS 1180505  2/1970  United Kingdom ........... 137/533.17

Primary Examiner—Robert G. Nilson
Attorney, Agent, or Firm—Bachman & LaPointe

[57] ABSTRACT

A check valve assembly is disclosed wherein a valve closure means includes a guide means and a connector means as a composite member for use in a pipline or conduit inclined to the vertical. The mass of the composite member relative to the angle of inclination and the coefficient of friction between the internal surface of the valve body and the external surface of the guide means is such that there is no risk of valve "jamming" action which would block operation of the valve. In addition the guide means ensures symmetrical fluid flow whereby the valve operates positively and rapidly eliminating chatter and erratic travel during the course of opening and closing when fluid flow is reversed.

12 Claims, 5 Drawing Sheets

MAXIMUM OPERATION ANGLE SINGLE PLUG AND PUPPET TYPE RETENTION VALVES

CROSS REFERENCE TO RELATED APPLICATION

This application is a Continuation-In-Part of U.S. application Ser. No. 569,823 entitled MAXIMUM OPERATION ANGLE SINGLE PLUG AND PUPPET TYPE RETENTION VALVES, filed Aug. 20, 1990, by Jesus E. Chacin and Amnon M. Vadasz F and now abandoned.

BACKGROUND OF THE INVENTION

The present invention relates to check valves and relates in particular to check valves useful in pipe lines, pumps and process equipment that are inclined to the vertical.

Prior art check valves of the ball and seat type used on inclined pipeline applications tend to respond to gravity causing them to settle to the side of the pipeline producing an unsymmetrical flow pattern around the ball when the valve is open.

When flow is reversed to effect valve closure the ball follows an irregular and erratic path in finding its way to the valve seat.

During this closure procedure numerous collisions occur causing damage to the ball, the valve body and the valve seat resulting in premature failure of the valve assembly.

In addition, the erratic travel path of the ball during the valve closure operation increases the time to close the valve.

SUMMARY OF THE INVENTION

Therefore, it is a principal object of the present invention to provide a check valve which is operable positively and rapidly with a minimum of interference in a pipeline which is inclined to the vertical.

A further object of the invention is the provision of a check valve operable under the above conditions including a valve closure means and a closure guide means operable to create a predetermined flow path about the closure means when the check valve is in the open position whereby upon reversal of flow the closure means is aligned centrally and symmetrically relative to the pipeline maintaining said alignment as the valve means moves to a closed position.

It is a further object of the invention to provide a check valve having a closure means and a guide means which bears an optimum relationship relative to the internal surface of the pipeline or the valve body within which it is operating thereby preventing "jamming" of the valve means in the open condition.

A still further feature of the invention is the provision of a valve closure means and valve guide means joined by a connector means defining collectively a composite member.

A further feature of the invention is the optimum relationship of the mass of the composite member to the angle of pipeline inclination and to the coefficient of friction between the internal surface of the valve body and the external surface of the guide means to avoid jamming the closure means when there is no fluid flow through the check valve or when the valve is returning from an open position to a closed position.

A check valve embracing certain features of the present invention may comprise a valve body contiguous with a pipeline, a valve seat means fixed within the body, a closure means operable to make a fluid tight seal with the valve seat means, and a guide means connected to the closure means operable to create an optimum fluid flow path between an internal surface of said valve body and an external surface of said guide means whereby said closure means is maintained in proper alignment relative to said seat means to protect said closure means and to insure the integrity of said fluid tight seal when the check valve is closed.

Other features and advantages of the present invention will become more apparent from an examination of the succeeding specification when read in conjunction with the appended drawings, in which;

PRIOR ART

Figure 1:
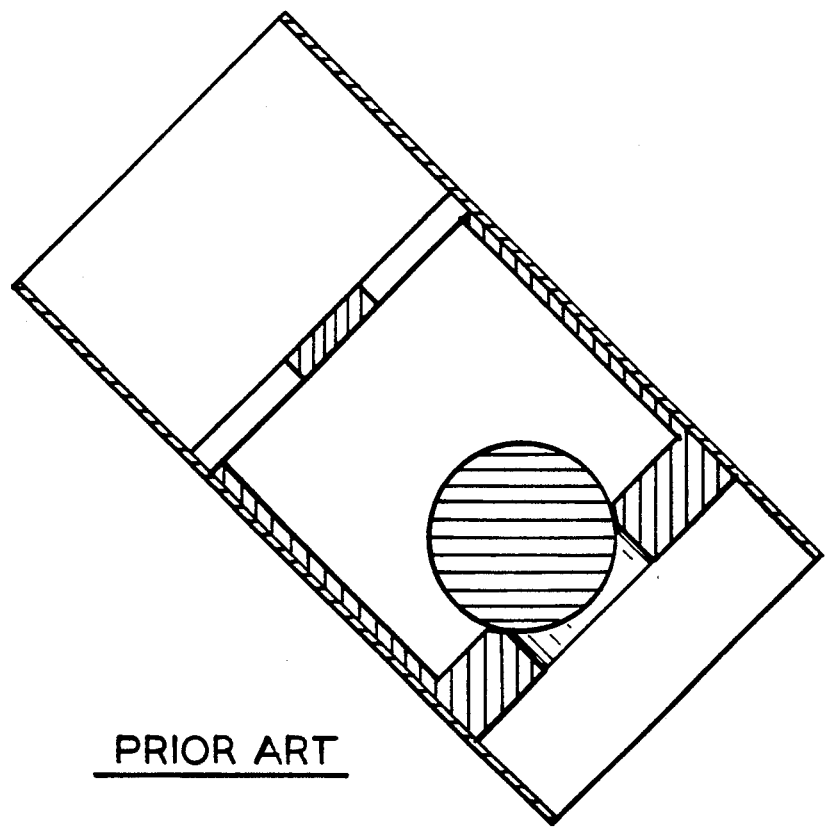
FIGS. 1 and 2 show typical prior art ball check valves in the closed and open positions, respectively.
Figure 2:
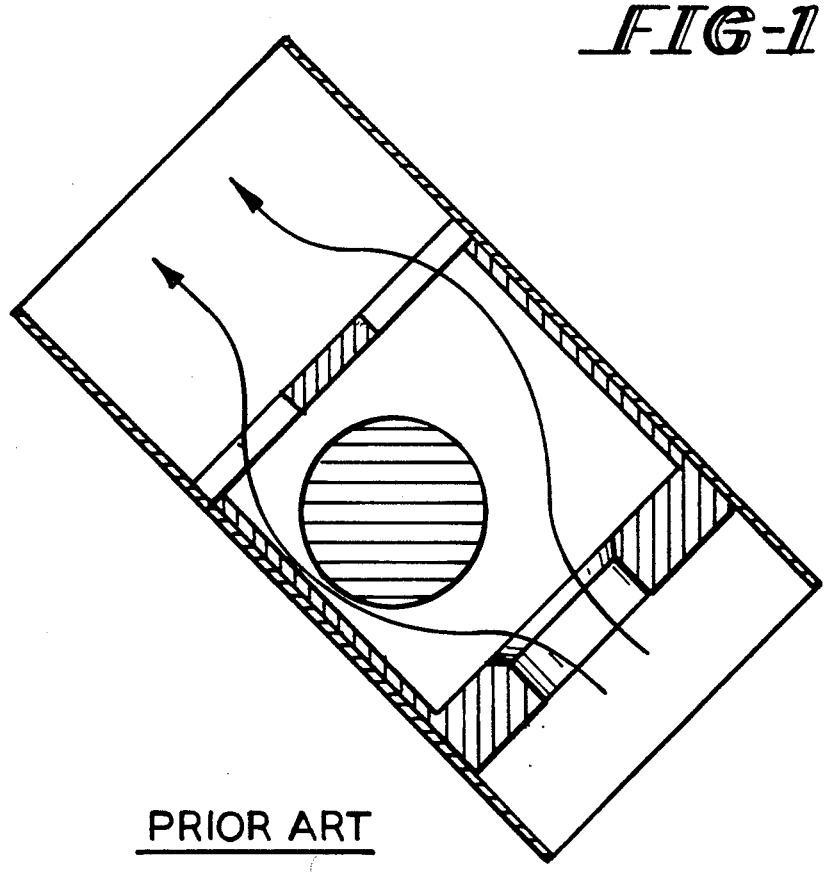

FIGS. 1 and 2 are prior art representations of a conventional ball check valve assembly disposed in a pipeline or conduit inclined to the vertical by an angle alpha.

As stated previously and as is apparent in FIG. 2, when the ball check valve is in the open condition fluid flow is not symmetrical about the ball because gravity operates upon the mass of the ball tending to draw it downwardly along a path parallel to the vertical.

This occurrence is undesirable because when fluid flow is reversed and the ball is seeking its seat, as shown in FIG. 1, the ball tends to collide and bounce along the internal surface of the valve body under the influence of unsymmetrical fluid flow as it approaches its valve seat to effect a closure.

This closing operation of a ball check valve in an inclined conduit or pipeline results in damage to the ball, damage to the valve seat and general wear and tear on the complete valve assembly due to the erratic tumbling and the multiple collision courses followed by the ball as it responds to gravity and to fluid flow.

DETAILED DESCRIPTION OF THE INVENTION

Figure 3:
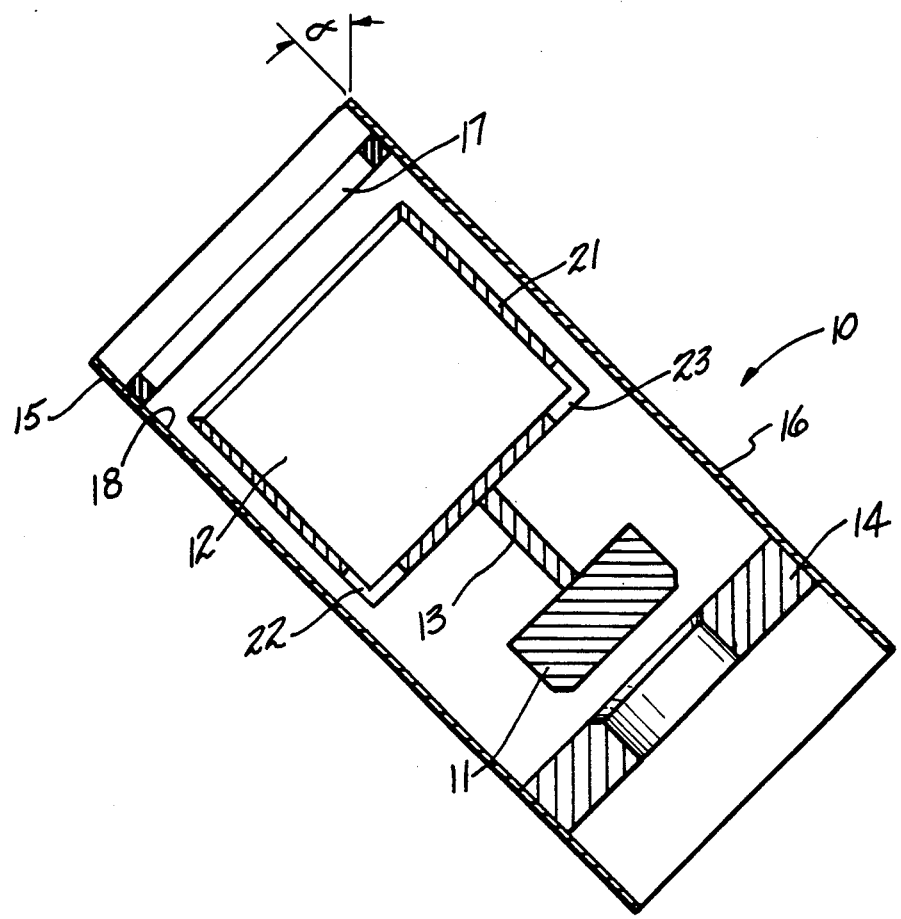
FIG. 3 is a sectional view of one embodiment of the check valve of the present invention.
Figure 4:
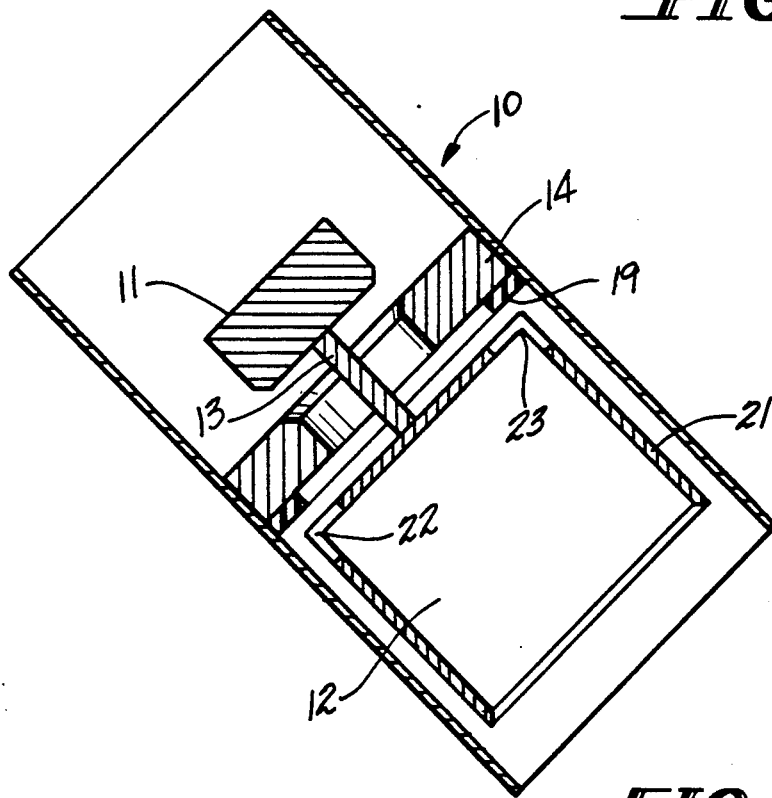
FIG. 4 is a view similar to FIG. 3 showing an alternative embodiment of the check valve of the present invention.

Referring now to FIGS. 3 and 4, a check valve and pipeline assembly inclined to the vertical by an angle alpha is indicated generally by the reference numeral 10. The check valve includes a closure means 11, a guide means 12, a connector means 13 joining the closure means and the guide means and a valve body 16 contiguous with a pipeline 15.

A valve seat 14 is fixed in the interior of a valve body 16 in the usual and customary manner and valve closure occurs when the closure means 11 is received in the seat means 14. In the preferred embodiment, the guide means 12 defines a cylindrical tubular member joined to the closure means by a rodlike element 13. Other embodiments of the guide means include a torpedo-like member having radially extending fins or a tubular member defining a regular polygon in cross-section.

A stop means 17 (FIG. 3) is fixed to the internal surface 18 of the valve body 16 to limit the stroke of closure means. Correspondingly, the embodiment of FIG. 4 includes a stop means 19 for limiting the motion of the closure means in similar fashion.

Figure 5:
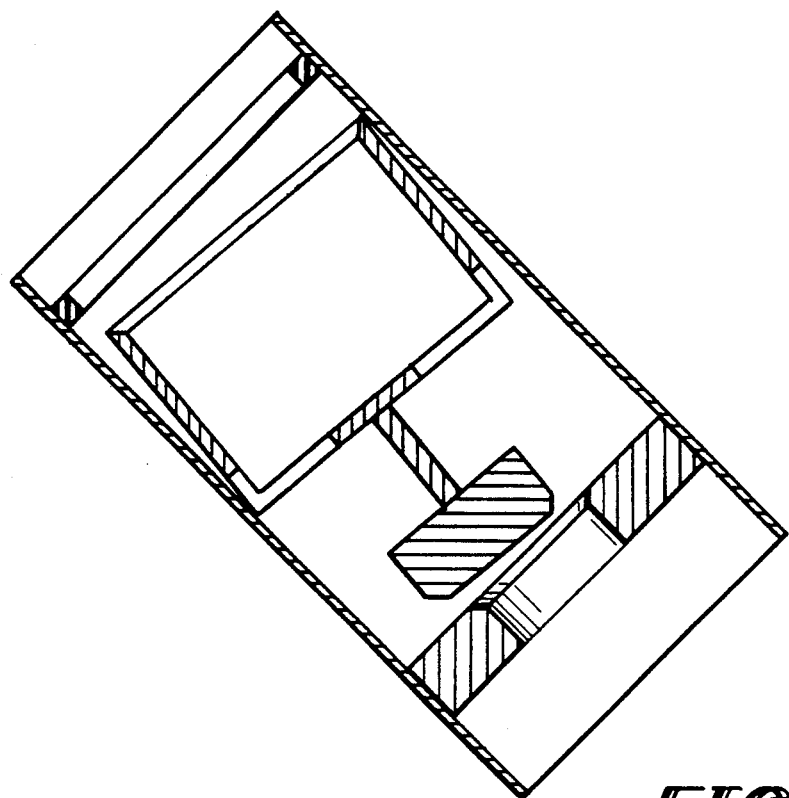
FIGS. 5 and 6 show an undesirable "jamming or locked" condition of a check valve assembly which the present invention overcomes.
Figure 6:
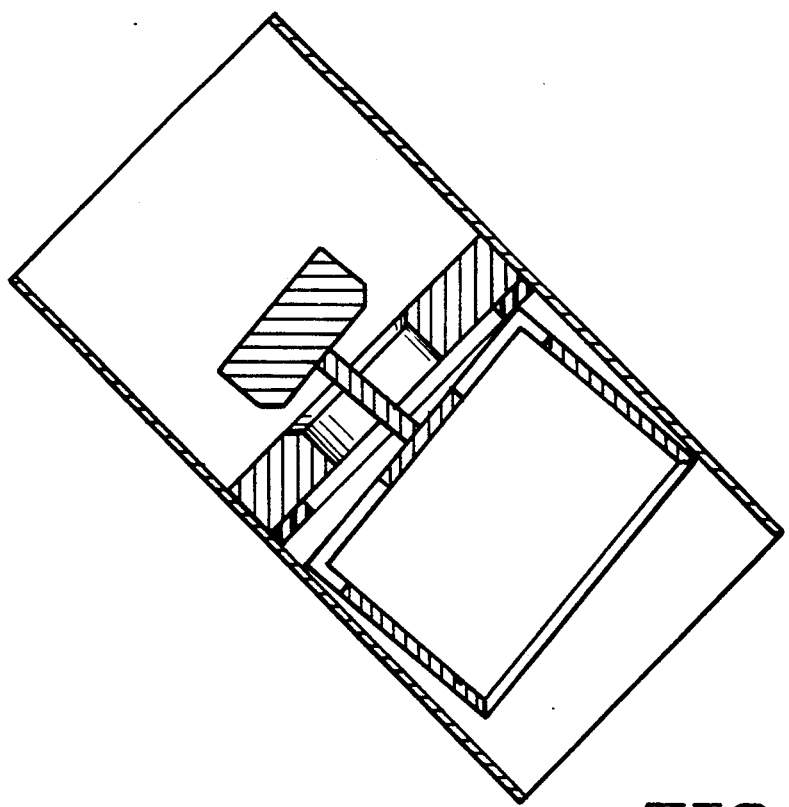

The closure means 11, connector means 13 and guide means 12 define collectively a composite member having a predetermined mass. The mass of the composite member relative to the angle alpha and relative to the spacing between the guide and closure means and coefficient of friction between the internal surface 18 of the valve body 16 and the external surface 21 of the guide means is such that the composite member slides freely along the internal surface of the valve body to prevent "jamming or locking" as depicted in FIGS. 5 and 6.

Figure 7:
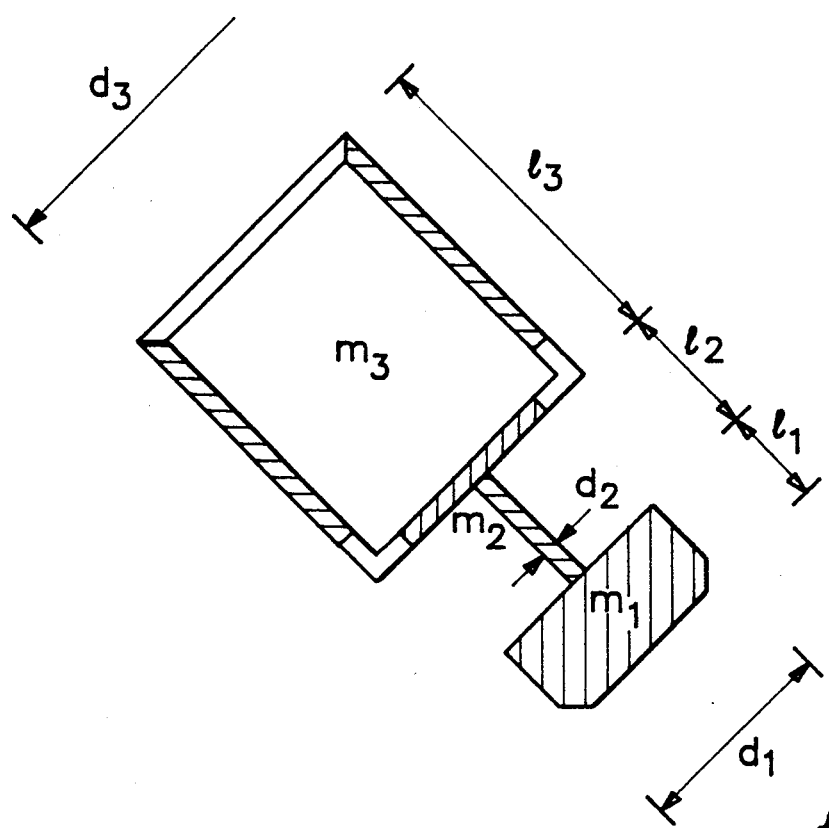
FIGS. 7, 8 and 9 are free body diagrams of the valves of the present invention.
Figure 8:
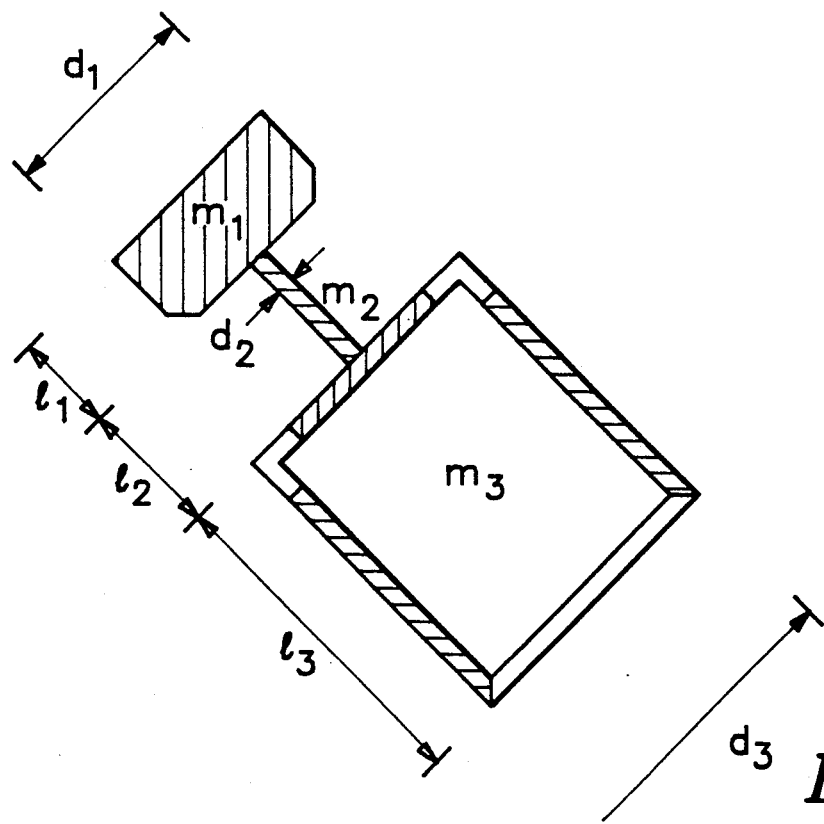

The derivation of these expressions will be made clear from a consideration of the following with reference to FIGS. 7 and 8. The puppet type valves comprise a closure 11 of mass $m_1$, a connecting rod 13 of mass $m_2$ and a guide 12 of mass $m_3$. These components have diameters $d_1$, $d_2$ and $d_3$ and lengths $l_1$, $l_2$ and $l_3$ respectively.

Figure 9:
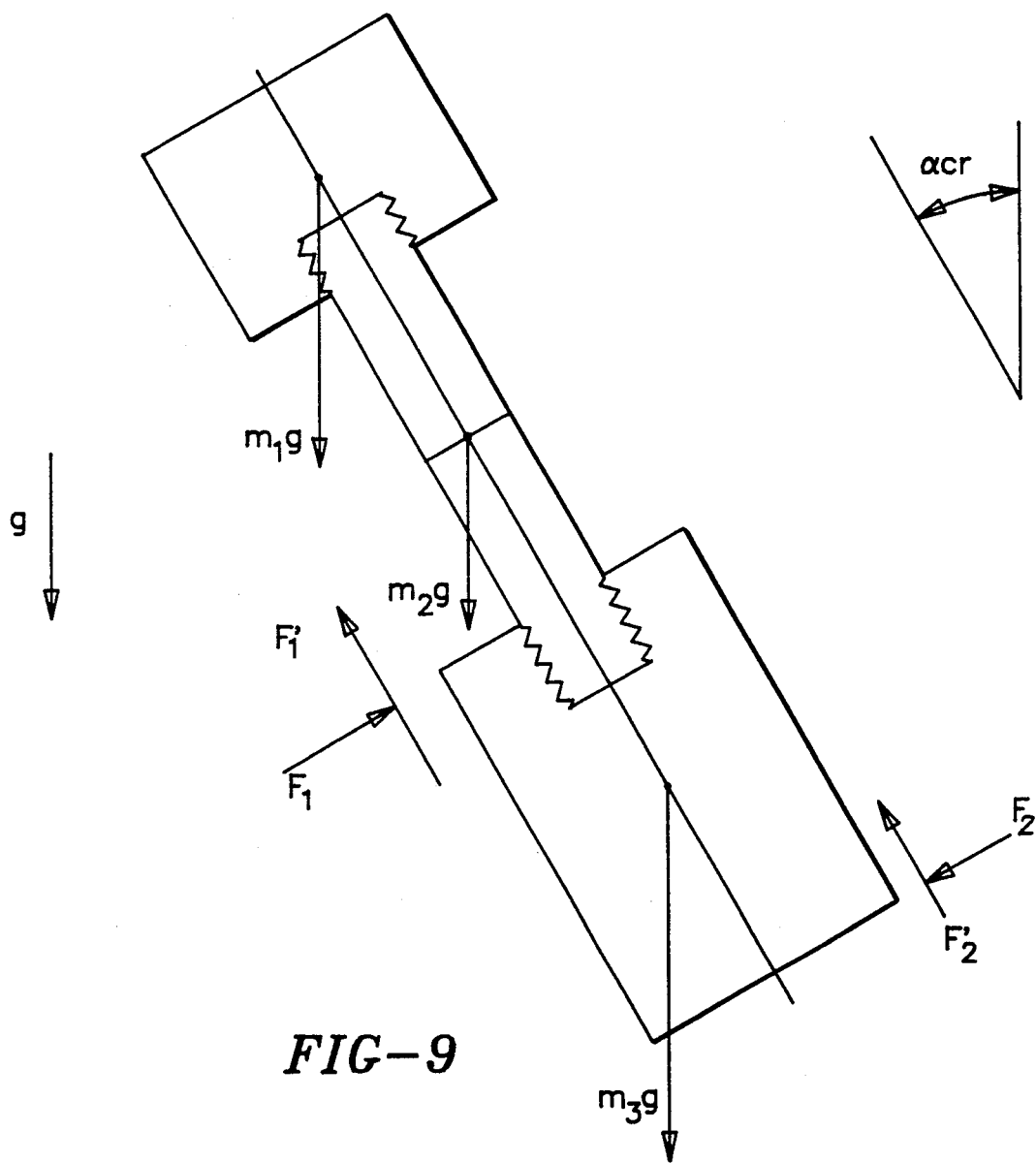

The following mathematical analysis is used to determine the relationship between the critical angle cr and the geometrical design (i.e., $m_1$, $m_2$, $m_3$, $l_1$, $l_2$, $l_3$, and $d_1$, $d_2$, $d_3$) of the valve. To do this we draw a free body diagram on a "stuck" valve showing the contact forces $F_1$ and $F_2$ resulting between the valve and the containing pipe (or pump barrel or valve cage) by the mere fact that the valve is "stuck" and cannot move. FIG. 9 shows the valve of FIG. 8 in a free body diagram:

The free body diagram also shows frictional forces $F_1'$ and $F_2'$ that rise at the contact points and are parallel to the longitudinal axis of the valve composite body $(m_1+m_2+m_3)$. Also the forces due to the masses $m_1$ and $m_2$ and $m_3$ and acting downwards in the direction of gravity, g, are shown as the weights $m_1g$, $m_2g$, and $m_3g$ emanating from the centers of gravity of each of the masses $m_1$, $m_2$, and $m_3$.

The frictional forces $F_1'$ and $F_2'$ can be calculated as proportional to the contact forces.

$F_1' \sim F_1, F'$ $F_2' \sim F_2,$ the proportionality constant being equal to a coefficient of friction, $m_1$ and $m_2$. Thus, we can write $F_1' = \mu_1 F_1$ $F_2' = \mu_2 F_2.$ Furthermore, due to the materials, fluids and nature of the contacting surfaces, both $m_1$ and $m_2$ are one and the same; therefore $F_1' = \mu F_1$ $F_2' = \mu F_2.$ All of the forces ($F_1'$, $F_1$, $F_2'$, $F_2$, $m_1g$, $m_2g$, $m_3g$) are vectors and can thus be decomposed into two components: one perpendicular to the longitudinal valve axis and one parallel to the valve axis. As an illustration, the force (weight) due to the mass $m_1$, namely $m_1g$, can be decomposed into a parallel component ($m_1g \cos \alpha_{cr}$) and a perpendicular component ($m_1g \sin \alpha_{cr}$).

Finally, since the valve has just become "stuck" at the onset of the critical angle $\alpha_{cr}$, the valve cannot move and a balance of forces (according to Newton's second law) along both perpendicular and parallel directions and a balance of torque about any point on the valve body must equal zero.

Application of these principles yield the following three equations:

$$m_1 g \sin \alpha_{cr} + m_2 g \sin \alpha_{cr} - F_1 + F_2 + m_3 g \sin \alpha_{cr} = 0 \quad (1)$$

$$m_1 g \cos \alpha_{cr} + m_2 g \cos \alpha_{cr} - \mu F_1 - \mu F_2 + m_3 g \cos \alpha_{cr} = 0 \quad (2)$$

$$-m_1 g \sin \alpha_{cr} \left[\frac{l_1}{2} + l_2\right] - m_2 g \sin \alpha_{cr} \left(\frac{l_2}{2}\right) + \mu F_1 \left(\frac{d_3}{2}\right) - \mu F_2 \left(\frac{d_3}{2}\right) + m_3 g \sin \alpha_{cr} \left(\frac{l_3}{2}\right) + F_2 l_3 = 0 \quad (3)$$

Equation (1) is obtained by summing all perpendicular forces.

Equation (2) is obtained by summing all parallel forces.

Equation (3) is obtained by summing all torques at the point where guide 3 and connecting element 2 are joined.

Solving the equations for the three variables ($F_1$, $F_2$ and $\alpha_{cr}$) yield the following:

$$F_1 = \left(\frac{m_1 + m_2 + m_3}{2}\right) g \left[\frac{\cos \alpha_{cr}}{\mu} + \sin \alpha_{cr}\right]$$

$$F_2 = \left(\frac{m_1 + m_2 + m_3}{2}\right) g \left[\frac{\cos \alpha_{cr}}{\mu} - \sin \alpha_{cr}\right]$$

$$\alpha_{cr} = \tan^{-1}\left[\mu\left(\frac{1}{\frac{m_1(l_1 + 2l_2) + m_2 l_2 - m_3 l_3}{(m_1 + m_2 + m_3)l_3}} - \mu\left(\frac{d_3}{l_3}\right) + 1\right)\right]$$

Simplifying the equations for $\alpha_{cr}$ we arrive at the following expression.

$$\alpha_{cr} = \tan^{-1}\left(\frac{1}{\mu} K\right)$$

where we have chosen to define $$K = \frac{1}{K_1 - K_2 + 1}$$

where, we have defined $$K_1 = \frac{m_1(l_1 + 2l_2) + m_2 l_2 - m_3 l_3}{(m_1 + m_2 + m_3)l_3}$$

and $$K_2 = \mu \frac{d_3}{l_3}$$

By rewriting the expression for $\alpha cr$ in the form of equation (1), we select $m_1, m_2, m_3, l_1, l_2, l_3$ and $d_1, d_2, d_3$ in such a way (by proper mechanical design) so as to make K equal to 1 which will guarantee that $$\alpha\, cr \sim \tan^{-1}\left(\frac{1}{\mu}\right)$$

which is the maximum possible theoretical angle.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A check valve for use in a fluid conduit wherein the conduit is inclined at an angle relative to vertical comprising:
   a valve body,
   a valve seat means within the body,
   a closure means operable to make a fluid tight seal with the valve seat means, and,
   a guide means spaced from and connected to the closure means by a rod-like element, said guide means being operable to create a fluid flow path between an internal surface of said valve body and an external surface of said guide means whereby said closure means is maintained in proper alignment relative to said seat means to insure the integrity of said fluid tight seal when the check valve is closed wherein the valve closure means, the rod-like element and the guide means define collectively a composite member of predetermined mass, the mass of said composite member being selected relative to the angle ($\alpha$) of inclination of the conduit from the vertical and relative to the coefficient of friction between the external surface of the guide means and the internal surface of the valve body so that $$\alpha cr = \tan^{-1}\frac{1}{\mu} K$$

wherein $\alpha\, cr$ is the critical angle of inclination of the conduit from the vertical such that the composite member slides freely along said internal surface to prevent the member from jamming in the valve body when there is no fluid flow through the valve or when flow is reversed.

2. The check valve of claim 1 wherein the valve body and the guide means are tubular both having a circular configuration in cross-section.

3. The check valve of claim 2 wherein the internal surface of the valve body and the external surface of the guide means cooperate to define an annular fluid flow path for fluid passing through the valve when in the open condition.

4. The check valve of claim 1 wherein the guide means is spaced axially from said closure means by a connector means.

5. The check valve of claim 4 wherein the connector means is a rod-like element.

6. The check valve of claim 1 including a stop means which cooperates with the valve seat means to limit motion of the closure means with the valve body.

7. The check valve of claim 6 wheren the stop means defines a projection extending radially inwardly from the internal surface of the valve body.

8. The check valve of claim 7 wherein the projection defines a ring.

9. The check valve of claim 1 wherein the guide means and the closure means are both located on the same side of the seat means.

10. The check valve of claim 6 wherein the stop means, the guide means and the closure means are located on the same side of the seat means.

11. The check valve of claim 1 wherein the closure means and the guide means are disposed on opposite sides of the seat means.

12. The check valve of claim 6 wherein the guide means and the stop means are disposed on one side of the seat means and the closure means is disposed on the opposite side of the seat means.

* * * * *